Apr. 3, 1923.
W. S. ALEXANDER
WASHER
Filed June 23, 1920
1,450,625
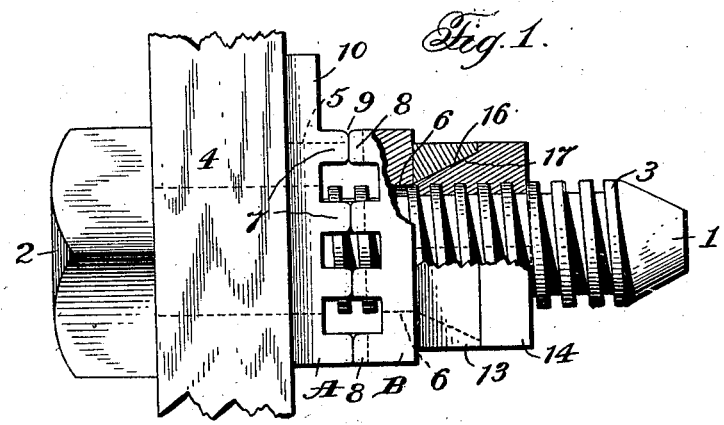
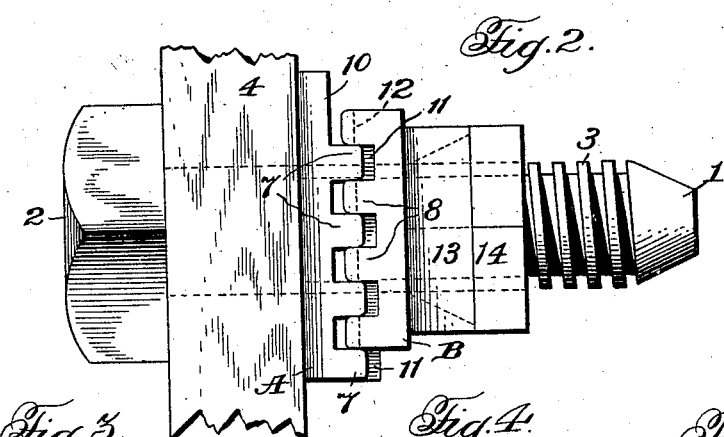
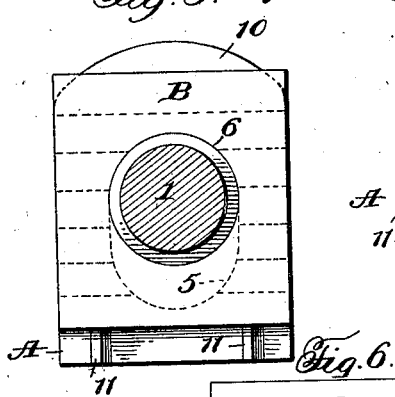
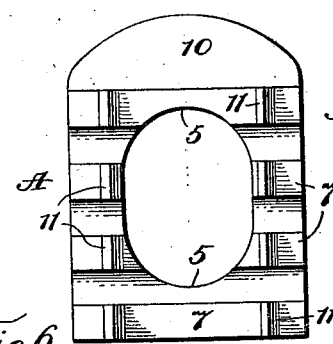
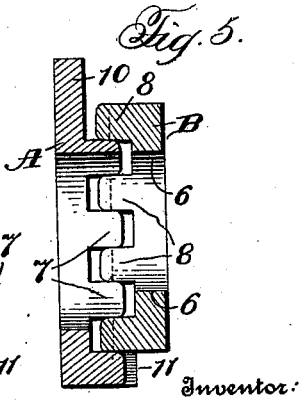
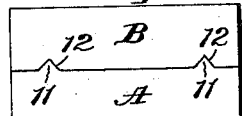
Witness:
Jas. E. Hutchinson.
Inventor:
William S. Alexander,
By
Milans & Milans Attorneys.

Patented Apr. 3, 1923.

1,450,625

UNITED STATES PATENT OFFICE.

WILLIAM S. ALEXANDER, OF ELSMERE, DELAWARE.

WASHER.

Application filed June 23, 1920. Serial No. 391,120.

*To all whom it may concern:*

Be it known that I, WILLIAM S. ALEXANDER, a citizen of the United States, residing at Elsmere, in the county of Newcastle and State of Delaware, have invented certain new and useful Improvements in Washers, of which the following is a specification, reference being had therein to the accompanying drawing.

My invention relates to new and useful improvements in washers and has for its principal object the provision of such a device which may be collapsed to reduce the thickness thereof.

Another object resides in the construction of the washer in two sections, one of which is slidable with respect to the other, and each section being constructed in such a manner that when they are collapsed they will interlock.

A further object consists in the provision of an extension on one of the members or sections adapted to be engaged for sliding that section with respect to the other.

With these and other objects in view my invention consists in the novel details of construction and arrangement of parts which will be more clearly understood from the following specification and drawings, in which:—

Fig. 1 is a side elevation with parts in section showing the washer in normal position.

Fig. 2 is a side elevation showing the washer in collapsed position.

Fig. 3 is a transverse section through the bolt showing a front view of the washer in collapsed form.

Fig. 4 is a front view of the back section of the washer.

Fig. 5 is a longitudinal vertical section through the washer in collapsed form, and Fig. 6 is a bottom view of the washer.

My washer is adapted for use with nuts and bolts and is primarily intended for use with nuts of the quick releasable type, although it will be understood that the nut construction forms no part of the present invention.

In the drawings, 1 indicates a bolt of usual construction having a head 2 and threaded portion 3, and 4 indicates the object through which the bolt is passed. My washer comprises two separate members shown at A and B, the member A having an elongated opening 5 and the member B having a round opening 6 through which the bolt 1 passes. The opening 6, in the member B is substantially of the same diameter as the bolt, whereas the elongated opening 5 in the member A is of such a length as to allow the member to be adjusted on the bolt with respect to the member B.

The member A is provided with a plurality of ribs 7 and the member B is provided with similar ribs 8. The longitudinal edges of each of these ribs 7 and 8 are rounded as shown at 9 for a purpose to be later described. The member A is provided, on one edge, with an extension 10. Each rib 7, of the member A is provided with a transversely extending tongue 11, adjacent each end, and the tongues of the several ribs will be in alignment as shown. Each rib 8, of the member B, will be provided with a groove 12 adjacent each end, and the grooves of the several ribs will be in alignment. Both the tongues 11 and grooves 12 are preferably V-shaped and it will be understood that the tongues are adapted to be normally received in the grooves.

In use the members A and B will be placed upon the bolt 1 with the faces of the ribs 7 and 8 abutting and with the tongues 11 received in the grooves 12. They will be held in such position by a plate 13 and nut 14 which may be of any desired construction, although preferably of the quick releasable type. For illustration I have shown the plate 13 provided with a beveled opening 16 adapted to receive a beveled shank 17 of the nut. The nut 14 will also preferably be constructed in sections. While I have illustrated this form of nut and washer, it will be understood, as previously stated, that these features form no part of the present invention which relates to the washer construction. With the parts assembled, as described, the washer may be collapsed by hitting upon the projection 10 of the member A. When thus struck the elongated opening 5 in this member will allow the member A to slide with respect to the member B and the ribs 8 of the member B, will be received between the ribs 7 of the member A. By having the longitudinal edges of the ribs 7 and 8 rounded as shown at 9, they will easily slide over one another so that the ribs will assume an interlocked position. The tongues 11 cooperate with the grooves 12 to guide the member A in its sliding movement. After the washer has been collapsed the plate 13 may be slid upon the bolt and the sections of the nut 14 released from the bolt.

My washer may be used upon a bolt in any position but if used on a horizontal bolt it may, at times, be desirable to have the projection 10 of the member A extend downwardly and this can be done provided there is sufficient space for the projection and for hitting the same to slide the member.

While I have described the preferred embodiment of my invention, it will be understood that I may make such minor changes as would fall within the scope of the appended claims.

What I claim is:—

1. A washer formed of two members, ribs formed on one face of each member, the ribs of one member having transversely extending grooves and the ribs of the other member having transversely extending tongues adapted to be received in the grooves.

2. A washer formed of two members, spaced ribs formed on one face of each member and adapted to normally abut, the ribs of one member having transversely extending grooves, and the ribs of the other member having transversely extending tongues adapted to normally be received in the grooves, one of said members being slidable with respect to the other and guided in its sliding movement by the tongue and groove connection.

3. A washer comprising two members, one member having a circular opening and the other having an elongated opening whereby it may be slid with respect to the first mentioned member, and spaced ribs formed on one face of each member, the spaced ribs of one member having transversely extending aligned grooves formed adjacent each end and the spaced ribs of the other member provided with transversely extending aligned tongues adjacent each end, the tongues of the one member adapted to be normally received in the grooves of the other member.

In testimony whereof I hereunto affix my signature in the presence of two witnesses.

WILLIAM S. ALEXANDER.

Witnesses:
GEORGE M. PEIRCE,
KATHARINE L. BOYS.